(12) United States Patent
Dai et al.

(10) Patent No.: US 11,472,725 B2
(45) Date of Patent: Oct. 18, 2022

(54) RECOVERY SYSTEM OF COMPOSITE POWDER CARRIER IN HPB MUNICIPAL WASTEWATER TREATMENT

(71) Applicants: Tongji University, Shanghai (CN); Hunan Sanyou Environmental Technology Co., LTD, Changsha (CN)

(72) Inventors: Xiaohu Dai, Shanghai (CN); Xiaoli Chai, Shanghai (CN); Bin Lu, Shanghai (CN); Dan Hou, Changsha (CN); Hongbo Han, Changsha (CN); Yue Mou, Changsha (CN); Jing Yi, Changsha (CN)

(73) Assignees: TONGJI UNIVERSITY, Shanghai (CN); HUNAN SANYOU ENVIRONMENTAL TECHNOLOGY CO., LTD, Changsha (CN)

( * ) Notice: Subject to any disclaimer, the term of this patent is extended or adjusted under 35 U.S.C. 154(b) by 98 days.

(21) Appl. No.: 16/996,931

(22) Filed: Aug. 19, 2020

(65) Prior Publication Data

US 2021/0130205 A1   May 6, 2021

(30) Foreign Application Priority Data

Oct. 31, 2019 (CN) .......................... 201911052238.8

(51) Int. Cl.
*C02F 3/08* (2006.01)
*B04C 5/08* (2006.01)
(Continued)

(52) U.S. Cl.
CPC ............ *C02F 3/085* (2013.01); *B01D 21/267* (2013.01); *B01D 36/045* (2013.01); *B04C 5/081* (2013.01);
(Continued)

(58) Field of Classification Search
CPC .. C02F 1/004; C02F 1/385; C02F 1/38; C02F 3/085; C02F 3/1221; C02F 3/107;
(Continued)

(56) References Cited

U.S. PATENT DOCUMENTS 6,953,529 B2 * 10/2005 Weir ...................... B01D 29/01
210/791
10,138,148 B2 * 11/2018 Boltz ........................ C02F 3/30
(Continued)

OTHER PUBLICATIONS

Derwent Translated Abstract for CN 108128889, Zhang et al, Published Jun. 8, 2019. (Year: 2019).*
(Continued)

*Primary Examiner* — Joseph W Drodge
(74) *Attorney, Agent, or Firm* — Bayramoglu Law Offices LLC

(57) ABSTRACT

A recovery system of composite powder carrier in HPB municipal wastewater treatment includes a biochemical tank and a concentration tank. The composite powder carrier is added to the biochemical tank for biochemically treating on the wastewater. The mixed liquid is then made to flow into the concentration tank. The supernatant obtained after filtration is then discharged. The concentrated sludge is returned to the biochemical tank, and the excess concentrated sludge is transported to a separator. The separator separates the substances with large specific gravity from those having smaller specific gravity, and the substances with large specific gravity are recycled to the biochemical tank for reuse. Matter having smaller specific gravity is discharged. The separator can be used to separate the composite powder carriers for recycling, which improves the utilization rate of the composite powder carriers and reduces the operation cost of the HPB technology for wastewater treatment.

17 Claims, 1 Drawing Sheet

(51) Int. Cl.
*B04C 9/00* (2006.01)
*C02F 1/38* (2006.01)
*C02F 3/12* (2006.01)
*B01D 36/04* (2006.01)
*C02F 9/00* (2006.01)
*B01D 21/26* (2006.01)
*B04C 5/081* (2006.01)
*C02F 1/00* (2006.01)

(52) U.S. Cl.
CPC ............... *B04C 9/00* (2013.01); *C02F 1/004* (2013.01); *C02F 1/385* (2013.01); *C02F 3/1221* (2013.01); *C02F 9/00* (2013.01); *B04C 2009/002* (2013.01); *C02F 2203/004* (2013.01); *C02F 2301/046* (2013.01)

(58) Field of Classification Search
CPC ............... C02F 3/00; C02F 2203/004; C02F 2301/046; C02F 2305/06; C02F 2303/18; C02F 3/08; C02F 3/121; C02F 9/00; B04C 5/081; B04C 9/00; B04C 2009/002; Y02W 10/10; B01D 21/26; B01D 21/267; B01D 36/04; B01D 36/045
USPC .............................. 210/189, 512.1, 781, 787
See application file for complete search history.

(56) References Cited

U.S. PATENT DOCUMENTS

| | | | |
|---|---|---|---|
| 2018/0016171 A1* | 1/2018 | Yeh | C02F 1/32 |
| 2018/0050945 A1* | 2/2018 | McDonald | C02F 9/00 |
| 2019/0263696 A1* | 8/2019 | Bott | C02F 9/00 |
| 2020/0115264 A1* | 4/2020 | Vogel | A01C 23/008 |
| 2020/0156963 A1* | 5/2020 | Bronk | C02F 11/126 |

OTHER PUBLICATIONS

Derwent Translated Abstract for CN 109205955, Luo et al, Published Jan. 15, 2019. (Year: 2019).*

* cited by examiner

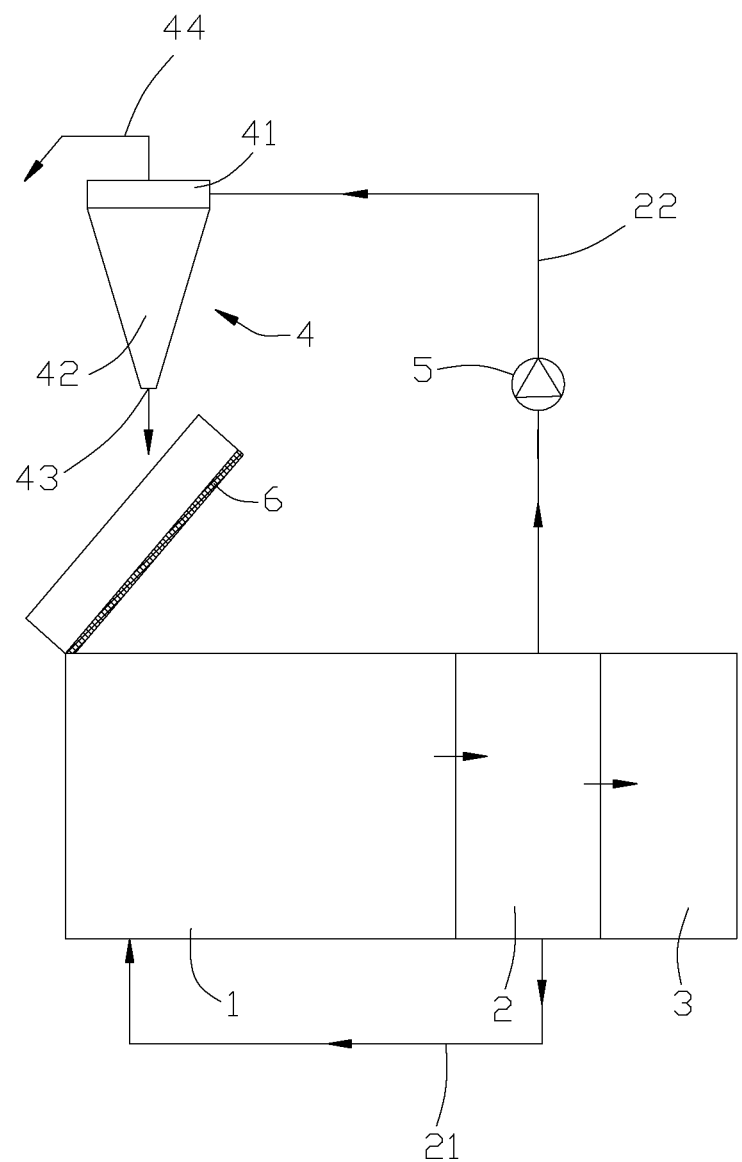

RECOVERY SYSTEM OF COMPOSITE POWDER CARRIER IN HPB MUNICIPAL WASTEWATER TREATMENT

CROSS REFERENCE TO THE RELATED APPLICATIONS

This application is based upon and claims priority to Chinese Patent Application No. 201911052238.8, filed on Oct. 31, 2019, the entire contents of which are incorporated herein by reference.

TECHNICAL FIELD

The present invention relates to municipal wastewater treatment, and more particularly, to a recovery system of composite powder carrier in HPB municipal wastewater treatment.

BACKGROUND

High concentration powder carrier biological fluidized bed is abbreviated as HPB. In the process of using HPB in municipal wastewater treatment, composite powder carrier must be added to the biochemical tank for biochemical treatment. The composite powder carrier is composed of the carrier with relatively large particles and other powders. The carrier generally includes diatomite, perlite, bentonite, attapulgite, powdered zeolite, kaolin fired clay powder and so on. Other powders provide a regenerative and constant carbon source for microorganisms in wastewater treatment. In the process of treating municipal wastewater, however, due to the limited time the powder retains water, a part of the composite powder carriers attached with microorganisms are not fully utilized for treatment. Unacceptable amounts of the powder are unused and directly discharged along with the excess sludge in the concentration tank. This is inefficient and adds substantially to wastewater treatment costs.

SUMMARY

To solve the above technical problems, the invention provides a recovery system of composite powder carrier in HPB municipal wastewater treatment. The method can improve the utilization rate of composite powder carrier and reduce the cost of wastewater treatment.

The technical scheme of the present invention is as follows: the recovery system of composite powder carrier in HPB municipal wastewater treatment includes a biochemical tank and a concentration tank for HPB municipal wastewater treatment. The composite powder carrier is put into the biochemical tank for biochemically treating the wastewater. The mixed liquid then flows into the concentration tank, and the supernatant obtained after filtration is then discharged. Subsequently, the concentrated sludge following the concentration treatment is returned to the biochemical tank, and the excess sludge is transported to the composite powder carrier cyclone separation and recovery system. The cyclone separation and recovery system separates and recovers the substances with large specific gravity, and transports the composite powder carrier in the substances with large specific gravity to the biochemical tank for reuse. The substances with small specific gravity are discharged, dehydrated and transported to a final holding tank for disposal.

Preferably, the substances with large specific gravity are sieved to remove inorganic impurities having large particles, and the sieved composite powder carrier is obtained.

Preferably, the excess sludge contains the composite powder carrier, including organic microbial matter attached to the carrier, large particle inorganic impurities, fine particle impurities, suspended microbial organic matter, inorganic ash and other impurities.

Preferably, the substances with large specific gravity include most of the composite powder carriers, the attached organic microbial matter and the large particle inorganic impurities.

Preferably, the substances with small specific gravity include the suspended microbial organic matter, a small amount of the composite powder carrier debris, the fine particle impurities and the inorganic ash.

Preferably, the composite powder carrier accounts for more than 80 wt % of the composite powder carrier in the excess sludge.

Preferably, the corresponding attached microbial organic matter accounts for 8 wt %-15 wt % of the organic matter in the excess sludge.

Preferably, the cyclone separation and recovery system adopts a cyclone separator, and the cyclone separator includes an upper hollow column and a lower hollow cone connected to the column. The excess sludge is transported to an inlet on the side wall of the column by a pump. The excess sludge is then separated by gravity and the rotating force of the cyclone separator. The substances with small specific gravity flow out from the overflow port at the top, and the substances with large specific gravity are discharged from a bottom outlet.

Preferably, the length-to-diameter ratio of the hollow cone is (9-12):1, the pipe diameter ratio of the inlet, the overflow port and the outlet is 2:1.5:1, the inlet pressure is 3-4 bar, and the inlet flow is 15-20 m$^3$/h.

Preferably, the sieving is performed using a sieve of 16-80 mesh having an inclined angle of 60°-75°.

It can be seen from the above technical scheme that in the treatment of municipal wastewater in the biochemical tank, the sludge constituents are effectively separated. Due to the differences in the specific gravities of the large composite powder carrier versus other suspended growth organic matter microbial micelles, the cyclone separator can be used to separate most of the composite powder carriers and discharge most of the suspended growth microbial organic matter. Likewise, the small amount of composite powder carrier debris, the fine particle impurities and the biodegradable ash from the excess sludge is also separated and discharged by controlling the appropriate rotating speed. The organic matter content in the sludge is increased by dewatering, treatment and disposal of the sludge, and the separated composite powder carrier is recycled into the biochemical tank, which not only improves the utilization rate of the composite powder carrier, but also reduces the operation cost of the HPB technology for wastewater treatment.

BRIEF DESCRIPTION OF THE DRAWINGS

FIGURE is a structural diagram of the present invention.

DETAILED DESCRIPTION OF THE EMBODIMENTS

The present invention is described in detail with reference to the FIGURE. The exemplary embodiment and description are used to explain the present invention, but not as a limitation of the present invention.

The present invention provides a recovery system of composite powder carrier in HPB municipal wastewater treatment and includes a biochemical tank 1 and a concentration tank 2 for the HPB municipal wastewater treatment. The composite powder carrier is added to the biochemical tank for biochemically treating the wastewater, and the mixed liquid then flows into the concentration tank. The composite powder carrier added to the biochemical tank is composed of microbial carrier and alternative carbon source, which improves the concentration of the mixed liquid in the biochemical tank constructs a fluidized bed system in which suspended growth and fixed adhesion growth microorganisms coexist in the same biological treatment unit. The supernatant obtained by filtration of the mixture is discharged into a standard-compliant filter tank 3. Following the concentration treatment, the concentrated sludge is returned to the biochemical tank via the second concentration tank outlet 21 for biochemical treatment again; and the excess sludge after the concentration treatment is transported to the cyclone separation and recovery system via the first concentration tank outlet 22.

The cyclone separation and recovery system separates and recovers the substances with large specific gravity from those with small specific gravity, and the recovered substances with large specific gravity are filtered using a sieve to remove large particle inorganic impurities and obtain the composite powder carrier. The obtained composite powder carrier is then transported to the biochemical pool for reuse, and the substances with small specific gravity are discharged.

In the process of biochemical treatment of municipal wastewater by HPB, the excess sludge from the concentration tank contains composite powder carriers, including attached microbial organic matter, large particle inorganic impurities, fine particle impurities, suspended microbial organic matter, inorganic ash and other impurities. Among these items, the substances with large specific gravity include most of the composite powder carriers, the attached microbial organic matter and the large particle inorganic impurities. The substances with small specific gravity include the suspended microbial organic matter, a small amount of composite powder carrier debris, the fine particle impurities and the inorganic ash. Moreover, most of the composite powder carriers account for more than 80 wt % of the composite powder carriers in the excess sludge. The attached microbial organic matter accounts for 8 wt %-15 wt % of the organic matters in the excess sludge. In the implementation process, due to the existence of alternative carbon sources in the composite powder carrier, microorganisms in wastewater will take these alternative carbon sources as nutrient sources to attach and grow on the carrier to form organic matter.

However, due to the limited time hydraulic retention time, growth of the microorganisms is retarded. Therefore, the organic matter attached with the microorganisms will adhere to the composite powder carrier and be separated along with the composite powder carrier to realize recycling. At the same time, due to the organic matter and the inorganic ash contained in the discharged substances with small specific gravity, biological energy can be generated in the process of treatment and disposal of the substances. After a large number of composite powder carriers are recovered through the system, the organic matter content of the discharged excess sludge can be increased to reach more than 45%, which makes the discharge valuable fuel for incineration power generation and biomass energy recovery. The composite powder carrier has a recovery rate of more than 80% by using the present invention, which greatly improves the utilization rate of the composite powder carrier and reduces wastewater treatment costs.

Specifically, the cyclone separation and recovery system adopt the cyclone separator 4, and the cyclone separator uses the specific gravity difference to separate the substances with small specific gravity from the substances with large specific gravity. The cyclone separator 4 includes the upper hollow column 41 and the lower hollow cone 42 connected to the column. The excess sludge from the concentration tank is transported to the inlet on the side wall of the column by the wear-resistant pump 5. The excess sludge is separated by gravity and the centrifugal force of the cyclone separator, that is, the substances with small specific gravity flow out from the overflow port at the top via second cyclone outlet 44, which can increase the content of organic matter in the discharged sludge. The substances with large specific gravity are discharged into the biochemical tank through the bottom first cyclone outlet 43 for recycling.

In the implementation process, the length-to-diameter ratio of the hollow cone is (9-12):1, the pipe diameter ratio of the inlet, the overflow port and the outlet is 2:1.5:1, the inlet pressure is 3-4 bar, and the inlet flow is 15-20 m/h. In this way, most of the composite powder carriers and the organic matter attached with the corresponding microorganisms can be discharged from the bottom outlet, while the inorganic ash, most of the organic matter and a small amount of composite powder carrier debris are discharged from the overflow port at the upper part. Since the excess sludge contains impurities with large particles, the specific gravity of these impurities may be substantially equal to that of the composite powder carrier, so the impurities with large particles will also be discharged from the bottom of the separator. For this part of impurities, a sieving is performed in the present invention. Generally, 16-80 mesh sieve can be used, and the installation angle of the sieve 6 is 60°-75° to achieve better sieving effect.

In the composite powder carrier of the present invention, the ultra-fine powder particles as "alternative carbon source" are smaller, while the carriers to be recovered are relatively large particles. Because the volumes and masses of the ultra-fine powder "alternative carbon source" particles and the carrier particles are quite different, the ultra-fine powder "alternative carbon source" particles can be firmly adsorbed on the surface of the carrier particles taking into account the fact that the carrier particles have large volume, large mass and large surface energy compared with the ultra-fine powder "alternative carbon source" particles. The ultra-fine powder "alternative carbon source" particles are difficult to overcome the repulsive energy peak and desorb back to the water body due to the asymmetric adsorption of quality and surface. Therefore, the composite powder carrier can be completely separated from the excess sludge. Of course, in the process of water treatment, there are many microorganisms which can directly use powder "alternative carbon source", all of which constitute the composite powder carrier with large specific gravity. However, the organic matters, a small part of carrier debris and the biodegradable ash account for a small proportion in the excess sludge from the concentration tank, and the specific gravity thereof significantly differs from the composite powder carrier. Relying on this specific gravity difference, the cyclone separator can be used for the separation by controlling the appropriate rotating speed, so as to obtain the composite powder carrier with high recycling value and attached with microorganisms and ultra-fine powder "alternative carbon source." It not only improves the utilization rate of the composite powder carrier, but also reduces the treatment cost.

The above implementation mode is only for the purpose of illustration of the present invention, rather than a limitation of the present invention. Those of ordinary skill in the art can make various changes and variations without departing from the spirit and scope of the present invention. Therefore, all equivalent technical solutions also belong to the scope of the present invention.

What is claimed is:

1. A recovery system of a composite powder carrier used in a high concentration powder carrier biological fluidized bed (HPB) for municipal wastewater treatment comprising
    a biochemical tank,
    a concentration tank comprising a first concentration tank outlet and a second concentration tank outlet, the biochemical tank and the concentration tank being configured and arranged for the concentration tank to receive and perform a concentration treatment on biochemically treated mixed liquid from the biochemical tank, wherein the biochemical tank is in fluid communication with the second concentration tank outlet, a filter tank, wherein the filter tank and the concentration tank are configured and arranged for the filter tank to receive a supernatant from the concentration tank, a composite carrier cyclone separation and recovery system comprising a first cyclone outlet and a second cyclone outlet, wherein the composite carrier cyclone separation and recovery system is in fluid communication with the first concentration tank outlet, and a composite powder carrier, wherein the composite powder carrier is put into the biochemical tank for performing a biochemical treatment on wastewater to obtain a mixed liquid, the mixed liquid flows out of the biochemical tank and into the concentration tank, and wherein the supernatant resulting from the concentration treatment flows out of the concentration tank and enters the filter tank for a filtration, a concentrated sludge resulting from the concentration treatment in the concentration tank is returned to the biochemical tank via the second concentration tank outlet, an excess concentrated sludge resulting from the concentration treatment in the concentration tank is transported out of the concentration tank to a composite powder carrier cyclone separation and recovery system, via the first concentration tank outlet, and the composite powder carrier cyclone separation and recovery system separates and recovers substances with a large specific gravity from substances with a small specific gravity, and wherein a first part of the composite powder carrier is contained in the substances with the large specific gravity and is transported to the biochemical tank for reuse via the first cyclone outlet and the substances with a small specific gravity are discharged, dehydrated and transported to a final place for a disposal via the second cyclone outlet.

2. The recovery system of the composite powder carrier according to claim 1, further comprising a sieve arranged and operable for removing large particle inorganic impurities from the substances with the large specific gravity to obtain the composite powder carrier.

3. The recovery system of the composite powder carrier according to claim 1, wherein the excess concentrated sludge contains the composite powder carrier, an organic microbial matter attached to the composite powder carrier, large particle inorganic impurities, fine particle impurities, a suspended microbial organic matter, and inorganic ash.

4. The recovery system of the composite powder carrier according to claim 3, wherein the cyclone separation and recovery system is operable for separating and recovering the substances with a large specific gravity, such that the substances with the large specific gravity comprise a first part of the composite powder carrier, the organic microbial matter attached to the composite powder carrier and the large particle inorganic impurities.

5. The recovery system of the composite powder carrier according to claim 4, wherein the cyclone separation and recovery system is operable for separating and recovering the substances with a small specific gravity, such that the substances with the small specific gravity comprise the suspended microbial organic matter, a second part of the composite powder carrier, the fine particle impurities and the inorganic ash, and the second part of the composite powder carrier is a small amount of composite powder carrier debris.

6. The recovery system of the composite powder carrier according to claim 4, wherein the cyclone separation and recovery system is operable for separating and recovering the substances with a large specific gravity, such that the first part of the composite powder carrier accounts for more than 80 wt % of the composite powder carrier in the excess concentrated sludge.

7. The recovery system of the composite powder carrier according to claim 4, wherein the cyclone separation and recovery system is operable for separating and recovering the substances with a large specific gravity, such that the organic microbial matter attached to the composite powder carrier accounts for 8 wt %-15 wt % of a total amount of the organic microbial matter attached to the composite powder carrier and the suspended microbial organic matter in the excess concentrated sludge.

8. The recovery system of the composite powder carrier according to claim 1, wherein the composite powder carrier cyclone separation and recovery system comprises a cyclone separator, and the cyclone separator comprises an upper hollow column and a lower hollow cone connected to the upper hollow column, and the excess concentrated sludge is transported to a side wall of the upper hollow column by a pump via the first concentration tank outlet, and then separated under an action of the excess concentrated sludge's own gravity and a rotating force of the cyclone separator, and the substances with the small specific gravity flow out from the second cyclone outlet at a top of the cyclone separator, and the substances with the large specific gravity are discharged from the first cyclone outlet at a bottom of the cyclone separator into the biochemical tank.

9. The recovery system of the composite powder carrier according to claim 8, wherein a length-diameter ratio of the lower hollow cone is (9-12):1; a pipe diameter ratio of the first concentration tank outlet, the second cyclone outlet and the first cyclone outlet is 2:1.5:1, a pressure in the first concentration tank outlet is 3-4 bar, and a flow in the first concentration tank outlet is 15-20 $m^3/h$.

10. The recovery system of the composite powder carrier according to claim 2, wherein the sieve has a size of 16-80 mesh at an inclined angle of 60°-75°.

11. The recovery system of the composite powder carrier according to claim 2, the recovery system being operable for forming an excess concentrated sludge, wherein the excess concentrated sludge contains the composite powder carrier, an organic microbial matter attached to the composite powder carrier, the large particle inorganic impurities, fine particle impurities, a suspended microbial organic matter, and inorganic ash.

12. The recovery system of the composite powder carrier according to claim 1, wherein the composite powder carrier is not a component of a biofilm.

13. The recovery system of the composite powder carrier according to claim 1, wherein the composite powder carrier comprises diatomite, perlite, bentonite, attapulgite, or kaolin fired clay powder.

14. The recovery system of the composite powder carrier according to claim 1, wherein the composite powder carrier comprises an alternative carbon source for attaching to microorganisms to form organic matter.

15. The recovery system of the composite powder carrier according to claim 1, the recovery system being operable for forming the mixed liquid such that the mixed liquid comprises microorganisms and the composite powder carrier comprises an alternative carbon source for attaching to microorganisms.

16. The recovery system of the composite powder carrier according to claim 1, wherein the composite powder carrier comprises a plurality of a composite powder carriers, each of the composite powder carriers comprising an alternative carbon source, wherein the substances with the large specific gravity comprise at least some of the composite powder carriers, and wherein the alternative carbon sources of the at least some of the composite powder carriers are not attached to microorganisms.

17. The recovery system of the composite powder carrier according to claim 1, wherein the composite powder carrier comprises a plurality of a composite powder carriers, each of the composite powder carriers comprising an alternative carbon source, wherein the substances with the large specific gravity comprise at least some of the composite powder carriers, and wherein the alternative carbon sources of the at least some of the composite powder carriers are partially attached to microorganisms.

\* \* \* \* \*